US005121140A

United States Patent [19]

Fukumura et al.

[11] Patent Number: 5,121,140

[45] Date of Patent: Jun. 9, 1992

[54] WRITING PRESSURE-CHANGING DEVICE FOR RECORDING DEVICE OR THE LIKE

[75] Inventors: Sadaaki Fukumura, Tokyo; Eiji Suzuki, Saitama, both of Japan

[73] Assignee: Iwatsu Electric Co., Ltd., Tokyo, Japan

[21] Appl. No.: 627,419

[22] Filed: Dec. 14, 1990

[30] Foreign Application Priority Data

Feb. 14, 1990 [JP] Japan ............................ 2-13283[U]

[51] Int. Cl.[5] ............................ G01D 15/16

[52] U.S. Cl. ............................ 346/139 R; 346/140 A; 346/29

[58] Field of Search ............... 346/140 R, 140 A, 141, 346/139 R, 29

[56] References Cited

U.S. PATENT DOCUMENTS

| | | | |
|---|---|---|---|
| 3,127,678 | 4/1964 | Muldoon | 346/29 |
| 4,157,552 | 6/1979 | Nakajima . | |
| 4,560,996 | 12/1985 | Aratsu | 346/139 R |
| 4,757,330 | 7/1988 | Onozato | 346/139 R |

FOREIGN PATENT DOCUMENTS

| | | |
|---|---|---|
| 0327132 | 2/1989 | European Pat. Off. . |
| 2258409 | 6/1974 | Fed. Rep. of Germany . |
| 2532548 | 5/1976 | Fed. Rep. of Germany . |
| 7916714 | 8/1980 | Fed. Rep. of Germany . |
| 3839803 | 6/1989 | Fed. Rep. of Germany . |

*Primary Examiner*—Benjamin R. Fuller
*Assistant Examiner*—V. DeVito
*Attorney, Agent, or Firm*—Oblon, Spivak, McClelland, Maier & Neustadt

[57] ABSTRACT

A writing-pressure changing device for use in a recording device or the like in which when one end of a pen holder is caused to ascend by a device such as a plunger. In this device the pen holder is pivotally moved with respect to a pivot, so that a recording pen supported on the other end of the pen holder is caused to descend to be brought into contact with a recording surface to make a drawing. The writing pressure-changing device includes a first cylinder which has an inclined guide groove formed in a side wall thereof, and where the first cylinder is adapted to be mounted around the plunger; a second cylinder is slidably fitted in the first cylinder and has a switch lever formed on an outer peripheral surface of the second cylinder, the switch lever projects from the guide groove in the first cylinder, and the second cylinder is adapted to be mounted around the plunger. A spring is engaged with an inner side of an upper end of the second cylinder and carried by a lower end of the plunger. In this way, the switch lever is moved along the guide groove to expand and contract the spring thereby adjusting a writing pressure of the recording pen.

2 Claims, 4 Drawing Sheets

WRITING PRESSURE-CHANGING DEVICE FOR RECORDING DEVICE OR THE LIKE

BACKGROUND OF THE INVENTION

1. Field of the Invention

This invention relates to a recording device such as a plotter or the like in which different kinds of recording pens are used in an interchangeable manner, and more particularly, to a device for changing the writing pressure by a pen holder when changing the recording pen.

2. Prior Art

Examples of various conventional recording pens used in a recording device or the like, such as a plotter, include a water-ink ball point pen, a water-ink fiber tip pen, a disposable pen, a ceramic pen, an oil-ink fiber tip pen, and so on. These pens have their own characteristics, and a proper one of them is selected depending on the purpose of use. For example, for drawing purposes, there is used the ceramic pen which can draw a line with a constant width and therefore can be easily handled. For drawing a graph, there is used the water-ink fiber tip pen which can draw a clear and colorful line.

However, when the kind of pen is changed, there are encountered problems that lines drawn on a recording paper may be blurred and that a nib of the pen may be damaged. These problems arise out of the fact that a proper writing pressure is not applied in accordance with the kind of pen. For example, a proper writing pressure depending on the kind of pen is about 50 g for the water-ink ball point pen, and about 20 g for the water-ink fiber tip pen, the oil-ink fiber tip pen and the ceramic pen. For example, when the water-ink ball point pen is selected and used, and then is exchanged by the ceramic pen, the writing pressure is too high for the ceramic pen, which results in problems such as blurred lines and damage of the pen nib.

SUMMARY OF THE INVENTION

In view of the above-mentioned problems, it is an object of this invention to provide a writing-pressure changing device which can set a proper writing pressure for a selected pen when changing the kind of pens.

The above object has been achieved by a writing-pressure changing device for use in a recording device or the like in which when one end of a pen holder is caused to ascend by ascending means such as a plunger, the pen holder is pivotally moved with respect to a pivot, so that a recording pen supported on the other end of the pen holder is caused to descend to be brought into contact with a recording surface to make a drawing, the writing pressure-changing device including: a first cylinder having an inclined guide groove formed in a side wall thereof, the first cylinder being adapted to be mounted around the plunger; a second cylinder slidably fitted in the first cylinder and having a switch lever, formed on an outer peripheral surface of the second cylinder, the switch lever projecting from the guide groove in the first cylinder, and the second cylinder being adapted to be mounted around the plunger; and urging means engaged with an inner side of an upper end of the second cylinder and carried by a lower end of the plunger; whereby said switch lever is moved along said guide groove to expand and contract the urging means, thereby adjusting a writing pressure of the recording pen.

BRIEF DESCRIPTION OF THE DRAWINGS

FIG. 2(*b*) is a view similar to FIG. 2(*a*), but showing an lower position of the pen;

DETAILED DESCRIPTION OF THE PREFERRED EMBODIMENTS

A preferred embodiment of the invention will now be described with reference to the drawings.

Figure 4:
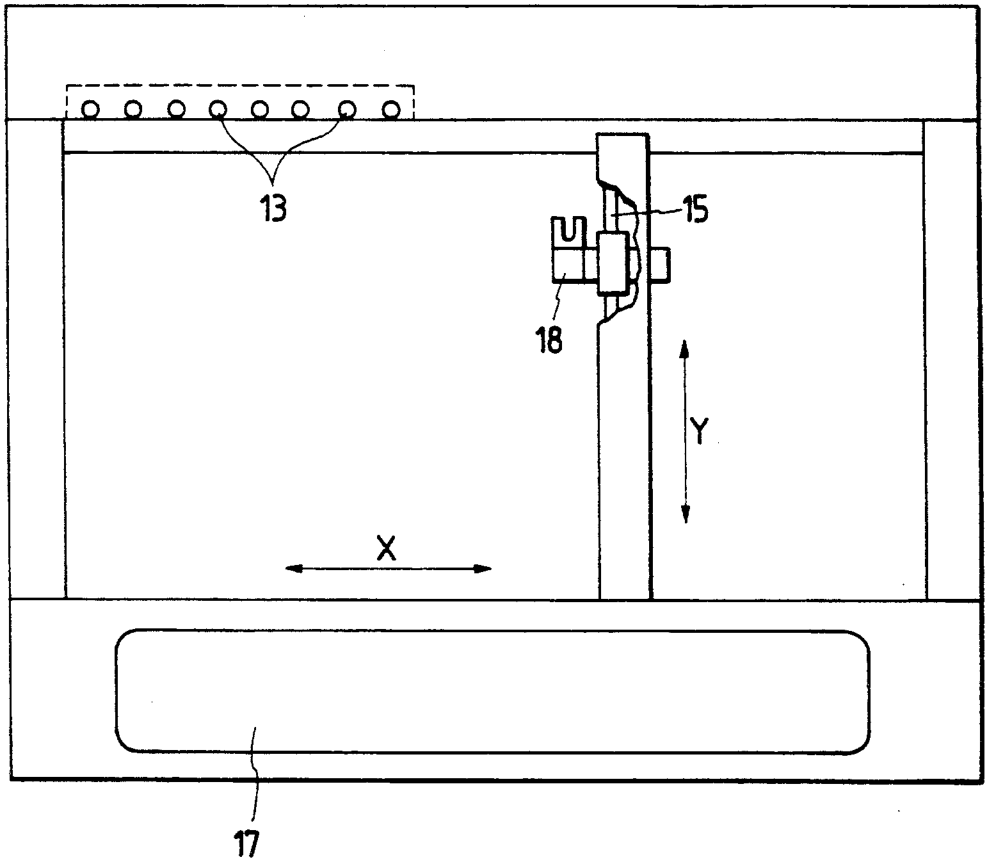
FIG. 4 is a view of one example of XY plotter to which the present invention is applied.

FIG. 4 shows one example of an XY plotter to which the present invention is applied. In this Figure, reference numeral 17 denotes an XY plotter body. A pen holder 18 is supported on and guided by a guide shaft 15 so as to move along the guide shaft 15. The guide shaft 15 is moved in an X-direction whereas the pen holder 18 is moved in a Y-direction, thereby drawing a picture.

Figure 2A:
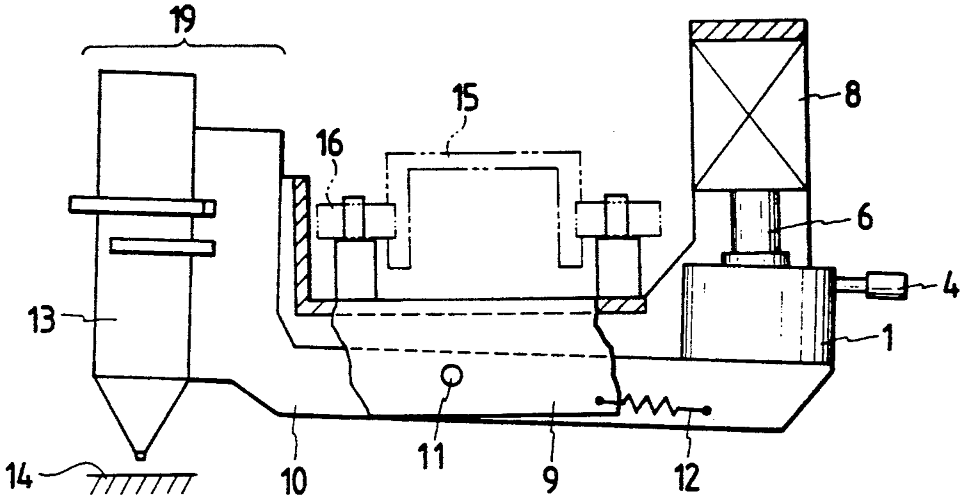
FIG. 2(*a*) is a side-elevational view of a pen holder, showing an upper position of a pen.
Figure 2B:
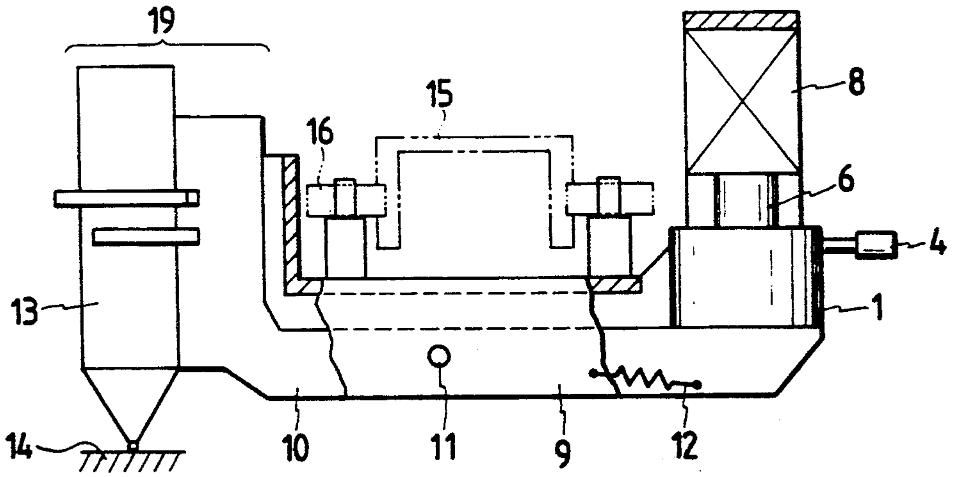

FIGS. 2(*a*) and 2(*b*) are side views of the pen holder 18, respectively, in which FIG. 2(*a*) shows a condition where a recording pen 13 is not in contact with a recording surface 14, and FIG. 2(*b*) shows a condition where the recording pen 13 is in contact with the recording surface 14.

In FIG. 2(*a*), the pen holder 18 is supported on and guided by the guide shaft 15 through rollers 16 mounted on a guide and support member 9. A pen holder member 10 of the pen holder 18 is pivotally connected to the guide and support member 9 at a pivot 11. A spring 12 urges the recording pen 13, which is held by a pen holder portion 19 of the pen holder member 10, in a direction away from the recording surface 14. A solenoid body 8 is fixedly mounted on the guide and support member 9. The solenoid body 8, when supplied with electric current, retracts a plunger 6, so that a first cylinder 1 as a result the pen holder member 10 is pivotally moved with respect to the pivot 11, thereby bringing the recording pen 13 into contact with the recording surface 14.

On the other hand, when the electric current is interrupted, the retracting of the plunger 6 is released, so that the recording pen 13 is moved away from the recording surface 14 under the influence of the spring 12.

Figure 1:
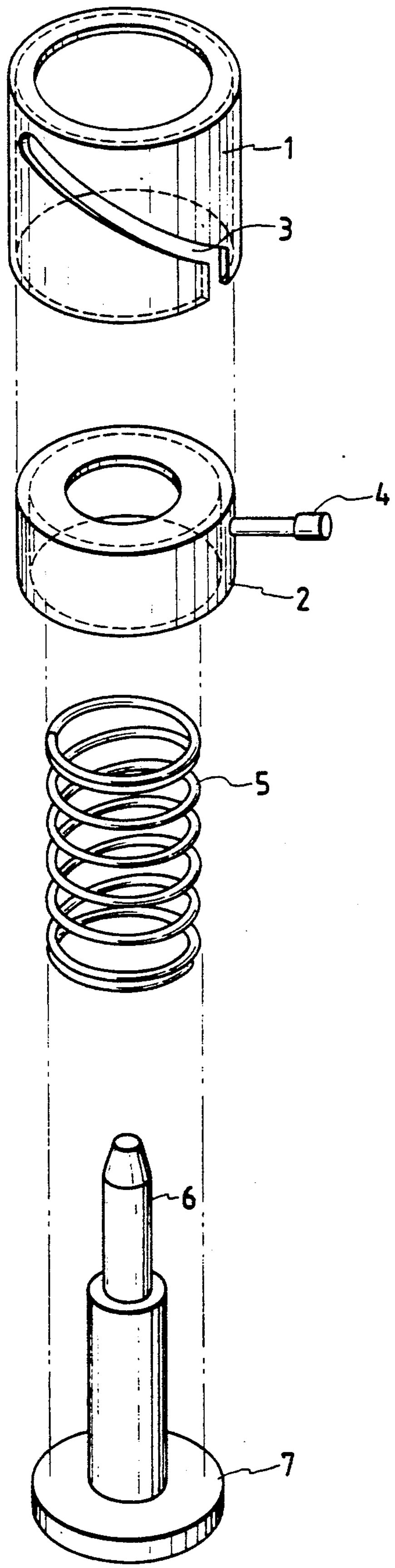
FIG. 1 is an exploded view showing those portions around a first cylinder.

FIG. 1 is an exploded view showing those portions around the first cylinder 1 forming the one end of the pen holder member 10. In this Figure, a guide groove 3 is formed through the side wall of the first cylinder 1, and is inclined at a predetermined angle. A second cylinder 2 is slidably fitted in the first cylinder 1. A switch lever 4 is mounted on the outer peripheral surface of the second cylinder 2. With this construction, the switch lever 4 can be manually moved along the guide groove 3.

The plunger 6 is adapted to be drawn or retracted into the solenoid body 8, and has at its lower end a springcarrying member 7. A spring 5 is carried by the springcarrying member 7, and the upper end of the spring 5 is engaged with the upper end of the second cylinder 2. The spring 5 imparts a writing pressure to the recording pen 13.

Figure 3A:
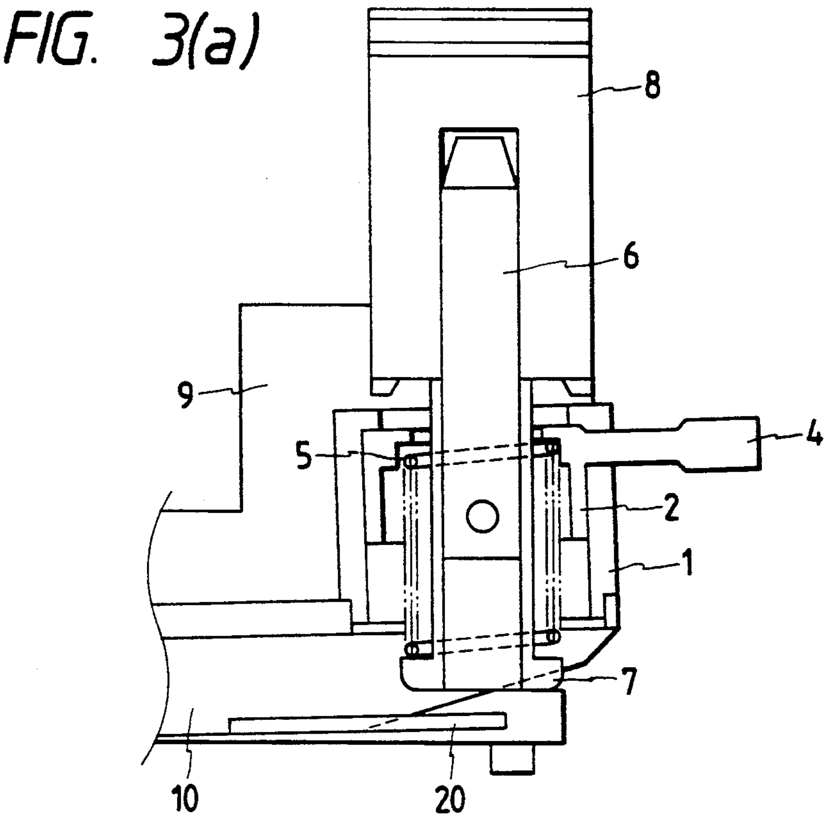
FIGS. 3(*a*) and 3(*b*) are a cross-sectional side-elevational view, showing those portions around the first cylinder 1, respectively.
Figure 3B:
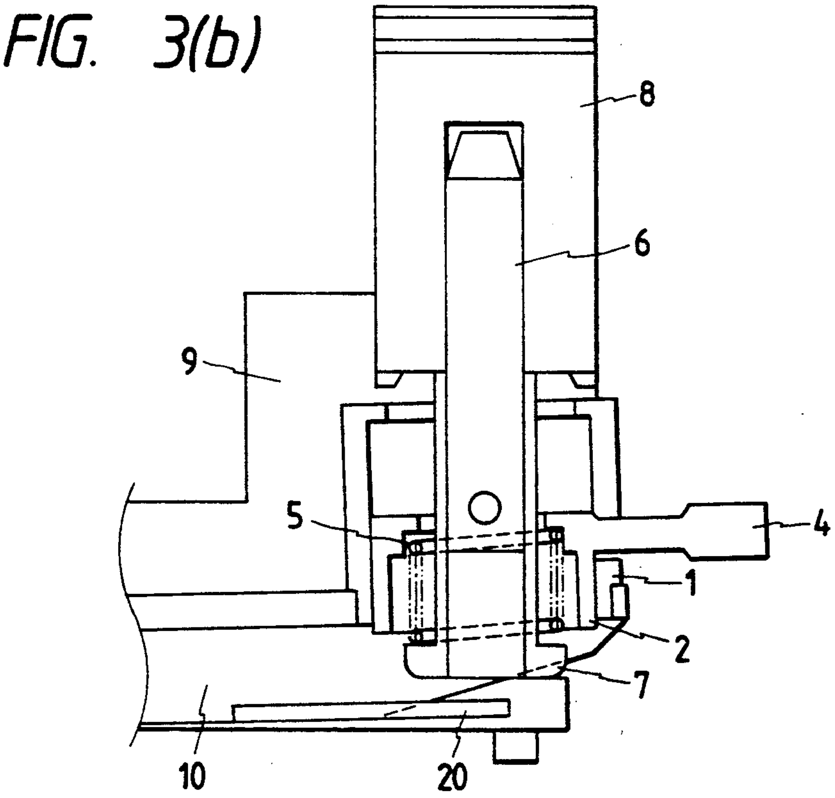

FIGS. 3(*a*) and 3(*b*) are cross-sectional side views showing those portions around the first cylinder 1 forming the one end of the pen holder member 10, respectively. FIG. 3(*a*) shows a condition in which the switch lever 4 is positioned at the uppermost portion of the guide groove 3. FIG. 3(*b*) shows a condition in which the switch lever 4 is positioned at the lowermost position of the guide groove 3, and the plunger 6 is in a retracted position as a result of application of electric current to the solenoid body 8.

In the condition of FIG. 3(*a*) in which the switch lever 4 is positioned at the uppermost portion of the guide groove 3, the spring 5 for applying the writing pressure applies an upward force to the upper end of the second cylinder 2 by its resiliency produced in the condition in which the spring 5 is carried by the spring-carrying member 7 and engaged with the upper end of the second cylinder 2.

On the other hand, as shown in FIG. 3(*b*), when the switch lever 4 is moved to the lowermost portion of the guide groove 3, the upper end of the second cylinder 2 is moved downward relative to the first cylinder 1, as compared with the condition of FIG. 3(*a*), and therefore the spring 5 is contracted by an amount corresponding to the amount of this downward movement, so that the force due to the resiliency of the spring 5 is increased. As a result, the spring 5 urges the upper end of the second cylinder 2 with a greater force, as compared with the condition of FIG. 3(*a*).

Thus, the switch lever 4 is moved along the guide groove 3 so as to expand or contract the spring 5, thereby imparting a desired writing pressure to the recording pen 13.

Then, when the supply of electric current to the solenoid body 8 is stopped, the spring 5 is released, so that the spring-carrying member 7 is stopped by a stopper 20 formed on the pen holder member 10.

In the above embodiment, although the operation has been described with respect to the case where the positions of stop of the switch lever 4 are the two points, that is, the uppermost and lowermost portions of the guide groove 3, the invention is not restricted to it. The force due to the resiliency of the spring 5 can be similarly adjusted if the positions of stop of the switch lever are provided midway between the uppermost and lowermost portions.

Preferably, the first and second cylinders are fitted relative to each other in such a manner as to provide a sufficient friction between the two in so far as the switch lever 4 can be manually moved along the guide groove 3.

The guide groove in the first cylinder has the predetermined inclination, and is provided in a cylindrical surface. Therefore, the switching movement of the switch lever can be effected smoothly and easily.

Further, the position of stop of the switch lever can be provided midway between the uppermost and lowermost portions of the guide groove, and therefore a fine adjustment of the writing pressure can be achieved, thereby enabling the optimum writing pressure depending on the kind of pens.

What is claimed is:

1. A writing-pressure changing device for use in a recording device having a pen holder comprising a first end and a second end, in which when the first end of the pen holder is caused to ascend by a plunger having a lower end thereof, said penholder is pivotally moved with respect to a pivot, so that a recording pen supported on the second end of said pen holder is caused to descend to be brought into contact with a recording surface to enable recording, said writing-pressure changing device comprising:
   - a first cylinder mounted around said plunger, said first cylinder having an inclined guide groove being formed in a side wall of said first cylinder;
   - a second cylinder slidably fitted in said first cylinder and mounted around said plunger, said second cylinder having an outer peripheral surface, said outer peripheral surface having a switch lever formed thereon, and an upper end having an inner side thereof, said switching lever projecting from said guide groove in said first cylinder; and
   - urging means engaged with the inner side of the upper end of said second cylinder and in contact with the lower end of said plunger;
   - wherein said switch lever is moved along said guide groove to expand and contract said urging means to adjust a writing pressure of said recording pen.

2. A device as claimed in claim 1, wherein said guide groove has a predetermined inclination.

* * * * *